Aug. 16, 1932.  L. E. HOWARD  1,871,691
METHOD AND APPARATUS FOR CONTROLLING TEMPERATURES AND THE LIKE
Filed Dec. 11, 1929  2 Sheets-Sheet 1
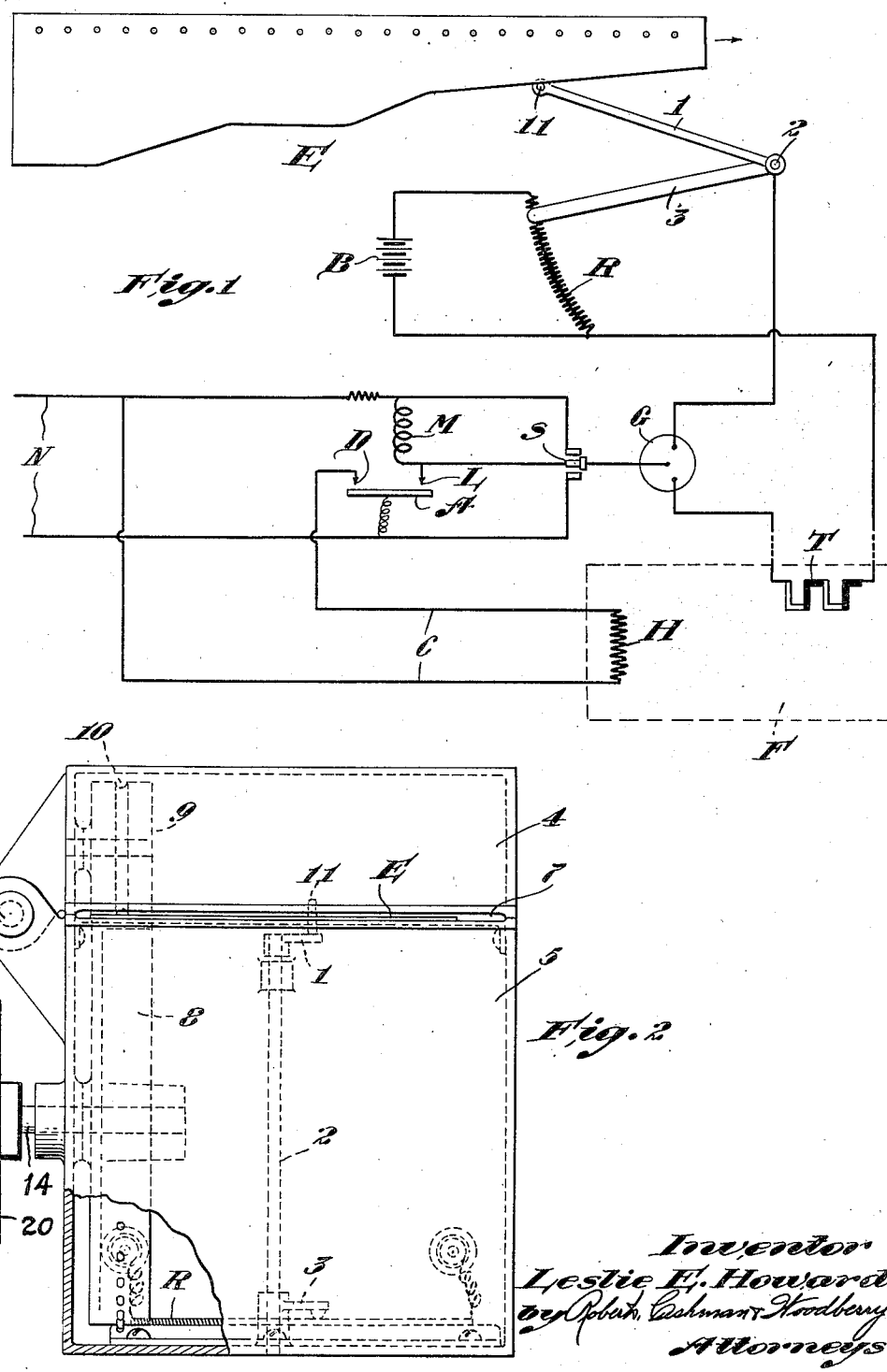
Inventor
Leslie E. Howard
by Roberts, Cushman & Woodberry.
Attorneys Aug. 16, 1932.   L. E. HOWARD   1,871,691
METHOD AND APPARATUS FOR CONTROLLING TEMPERATURES AND THE LIKE
Filed Dec. 11, 1929   2 Sheets-Sheet 2

Inventor
Leslie E. Howard
by Roberts, Cushman & Woodberry
Attorneys

Patented Aug. 16, 1932

1,871,691

UNITED STATES PATENT OFFICE

LESLIE E. HOWARD, OF LOCKPORT, NEW YORK, ASSIGNOR TO SIMONDS SAW AND STEEL COMPANY, OF FITCHBURG, MASSACHUSETTS, A CORPORATION OF MASSACHUSETTS

METHOD AND APPARATUS FOR CONTROLLING TEMPERATURES AND THE LIKE

Application filed December 11, 1929. Serial No. 413,274.

While this invention is applicable to any art in which it is desired to effect periodic changes in the operation of apparatus according to a predetermined schedule, it is particularly applicable to the control of electric furnaces for treating steel. In such treatment batches of steel are successively subjected to different temperatures for different periods of time, the treatment sometimes extending over a period of several days. For example, in annealing certain steel it is common practice to bring the temperature of the steel as rapidly as possible to 1600° F., hold the temperature at this point for five hours, then decrease the temperature to 750° F., then again raise the temperature to approximately 1410° F., maintain this temperature about ten hours, and then decrease the temperature at a predetermined rate to approximately 500° F.

Objects of this invention are to provide a method and apparatus whereby this temperature control may be effected automatically for any desired period of time and for any predetermined variations whereby the sequence and/or periods of temperatures may be controlled as desired by substituting any one of a set of control elements, and to provide apparatus suitable for any kind of control in which a selected control element is merely fed through the apparatus without being attached thereto.

For the purpose of illustration a concrete embodiment of the invention is shown in the accompanying drawings in which:

Fig. 1 is a diagram of one embodiment showing a typical control element in elevation;

Fig. 2 is a side elevation of apparatus for driving and guiding the control element, showing a part of the casing broken away;

Figure 3:
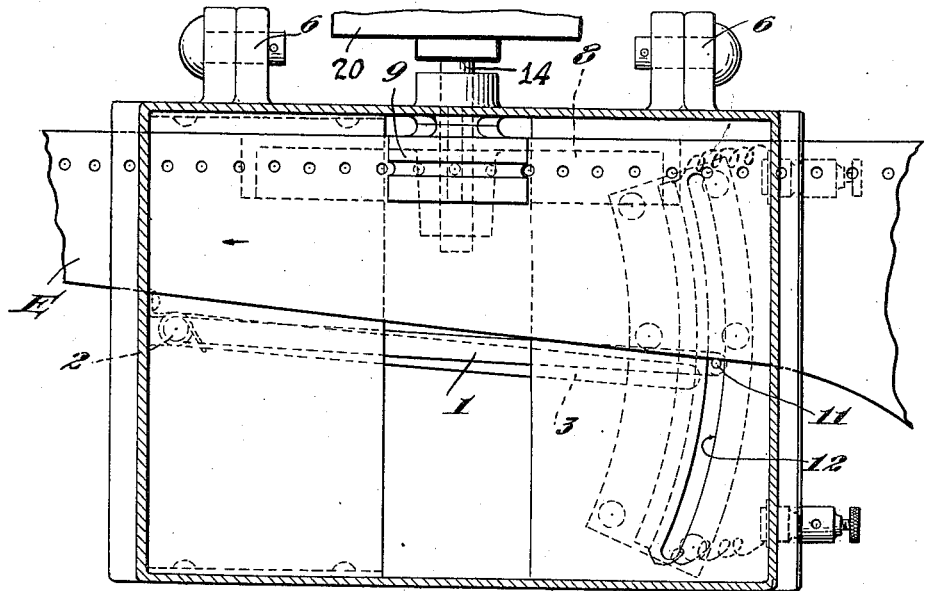
Fig. 3 is a plan view of the control apparatus, showing the casing in section.
Figure 4:
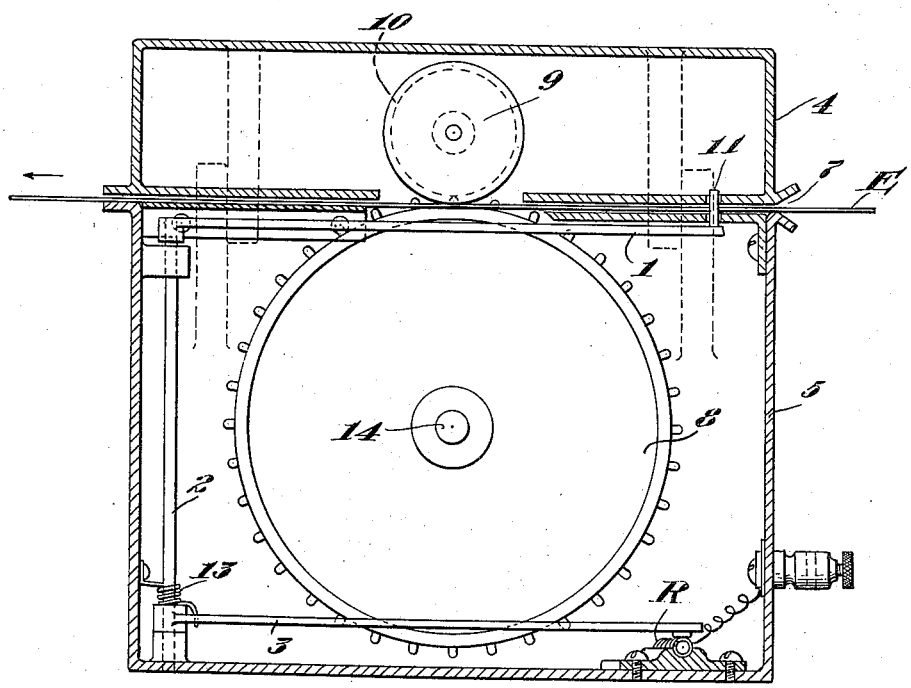
Fig. 4 is another side elevation of the control apparatus showing the casing in section.

The particular arrangement shown in Fig. 1 for the purpose of illustration comprises a thermo-couple T and a source of potential B connected in parallel across a variable resistance R in a branch circuit including galvanometer G. The thermo-couple T may be associated with a furnace F having a heating element H connected to circuit C controlled by magnet M having an armature A for closing the heater circuit C when the magnet is energized, thereby connecting the heater element across line N which is connected to a suitable source of heating current. The galvanometer G controls switch S which in its lower position closes circuit through magnet M and in its upper position short-circuits magnet M. A locking contact L is associated with the armature A, which closes the circuit C at D, so that the energization of magnet M continues, even after its circuit is opened at S, until the switch S moves to its upper position to short-circuit the magnet, whereupon the armature A moves away from both contacts D and L. The amount of resistance R included in the circuit of the thermo-couple and galvanometer is controlled by the element E (hereinafter to be described) through the medium of an arm 1, shaft 2, and switch arm 3, the resistance R and the battery B serving as a potentiometer. When the arm 3 is in such position that the electromotive force of the source B exactly balances the electromotive force of the thermo-couple T, the switch S of the galvanometer G stands in the position shown in Fig. 1. When the electromotive force of thermo-couple T is less than the potential drags produced by source B across that portion of resistance R included in the galvanometer circuit, due either to a decrease of temperature in the furnace F or upward movement of the switch arm 3, the switch S of the galvanometer moves downward to close the circuit of magnet M thereby to supply current to the heater H. When the electromotive force of the thermo-couple T exceeds the potential produced by source B across that part of the resistance R which is included in the galvanometer circuit, due either to an increase of temperature in the furnace F or to a downward movement of the switch arm 3, the galvanometer switch S moves to its upper position to short-circuit magnet M and thereby open the circuit C. Thus by changing the position of the switch arm 3, the temperature of the furnace may be regulated at will; and according to this invention the regulation of the amount of resistance R in the galvanometer circuit is effected automatically by control apparatus such as shown, for example, in Figs. 2 to 4 inclusive.

This apparatus comprises a casing in upper and lower parts 4 and 5, hinged together at 6, with a slot 7 therebetween to receive the control element E which is in the form of a sheet of stiff material such as thin sheet metal, fiber board or the like. The control element is automatically fed through the slot 7 by a sprocket wheel 8. A pressure roll 9, having a groove 10 to accommodate the teeth of the sprocket wheel, holds the element E in contact with the periphery of the wheel 8. The control element is applied to the apparatus merely by inserting it in one end of slot 7 until it is picked up by the sprocket wheel 8 and after the element has been fed entirely through the machine it may be removed by hand from the opposite side.

One edge of the control element E (the lower edge in Figs. 1 and 3), constitutes a cam shaped to move the switch arm 3, as the element feeds through the machine, in accordance with the predetermined variations in the resistance R. The arm 1 has a pin 11 which extends across the slot 7 and moves in an arcuate slot 12. The spring 13 holds the pin 11 against the cam edge of the control element E so that the arms 1 and 3 and shaft 2 move together in accordance with the shape of the cam edge. While the control element may be fed either at a constant of a variable rate, it is preferably driven at constant rate by a clock or other constant speed means 20 connected to the shaft 14 of the sprocket wheel 8.

From the foregoing it will be evident that this invention affords means for effecting changes in the operation of apparatus throughout any desired period of time, the length of time being increased at will by increasing the length of the control element. It will also be understood that the same cycle of operations may be automatically repeated as many times as desired merely by making the control element in the form of an endless band in which case the casing would have to be opened to insert the band if the ends of the band were fast together. It will of course be understood that ordinarily a plurality of control elements having their cam edges shaped differently to effect the different variations desired would be employed for different operations. It will also be understood that new control elements may be readily made by the user from blank bands perforated along one edge merely by cutting the other edge to the desired contour.

Important advantages of this invention reside in the reduction in the number of parts and the simplicity of construction which make it possible to provide a reliable and continually variable automatic control of a heating element by utilizing an electrical device as a galvanometer which is differentially responsive to opposed electromotive-forces, one of which is proportional to a desired predetermined time temperature characteristic, while the other of these forces is proportional to furnace temperature. It will be seen that the use of elaborate and/or expensive devices or parts is avoided, and a considerable reduction in the number of parts required is effected, particularly by the preferred arrangement wherein the galvanometer operates to close the heating circuit and electromagnetic means function to hold this circuit closed until the galvanometer retracts from its circuit closing position to another predetermined position in which the electromagnetic holding means is short circuited and the heating circuit interrupted. Moreover, the apparatus is efficient and compactly arranged to be enclosed in such a manner that it may be readily accessible for inspection or repair.

I claim:

1. Apparatus for controlling the temperatures of furnaces and the like comprising means associated with the furnace for producing an electromotive-force proportional to the temperature of the furnace, an adjustable supply of electromotive-force, means for maintaining these electromotive-forces effective continually and uninterruptedly, continually operable means for regulating the temperature of the furnace including an electrical device differentially responsive continually and uninterruptedly to said electromotive-forces, and means for automatically varying said adjustable supply in accordance with desired changes in said temperature, said last means including a variable resistance having a movable actuator, an unattached sheet of material having a cam edge engageable with said actuator, and means including a roller for feeding said sheet past said actuator.

2. Apparatus for controlling the temperatures of furnaces and the like comprising means associated with the furnace for producing an electromotive-force proportional to the temperature of the furnace, an adjustable supply of electromotive-force, means for regulating the temperature of the furnace including an electrical device differentially responsive to said electromotive-forces, means for automatically varying said adjustable supply in accordance with the desired changes in said temperature, said last means including a variable resistance having a movable actuator, an unattached sheet of material having a cam edge engageable with said actuator, and cooperating rollers spaced to engage opposite faces of said unattached sheet for feeding the same past said actuator, and continuously operating means for driving at least one of said rollers.

3. Apparatus for controlling the temperatures of furnaces and the like comprising means associated with the furnace for producing an electromotive-force proportional to the temperature of the furnace, an adjustable supply of electromotive force, means for regulating the temperature of the furnace including an electrical device differentially responsive to said electromotive-forces, means for automatically varying said adjustable supply in accordance with the desired changes in said temperature, said last means including a variable resistance having a movable actuator, an unattached sheet of material having a cam edge engageable with said actuator, said unattached sheet having a series of feeding perforations, cooperating rollers spaced to engage opposite faces of said unattached sheet for feeding the same past said actuator, and projections spaced about one of the rollers for engagement in the perforations of said sheet.

4. Apparatus for controlling the temperatures of furnaces and the like comprising means associated with the furnace for producing an electromotive-force proportional to the temperature of the furnace, an adjustable supply of electromotive force, means for regulating the temperature of the furnace including an electrical device differentially responsive to said electromotive forces, means for automatically varying said adjustable supply in accordance with the desired changes in said temperature, said last means including a variable resistance having a movable actuator, an unattached sheet of material having a cam edge engageable with said actuator, means providing a passageway for conducting said sheet past said actuator, and means for feeding said sheet longitudinally through said passageway when the leading end of said sheet is inserted into the entrance of said passageway, said sheet being freely removable when its trailing end reaches the exit of said passageway.

5. Apparatus for controlling the temperatures of furnaces and the like comprising means associated with the furnace for producing an electromotive-force proportional to the temperature of the furnace, an adjustable supply of electromotive force, means for regulating the temperature of the furnace including an electrical device differentially responsive to said electromotive forces, means for automatically varying said adjustable supply in accordance with the desired changes in said temperature, said last means including a variable resistance having a movable actuator, an unattached sheet of material having a cam edge engageable with said actuator, means providing a passageway for conducting said sheet past said actuator, means for feeding said sheet longitudinally through said passageway when the leading end of said sheet is inserted into the entrance of said passageway, the sheet being freely removable from said feeding means when its trailing end reaches the exit of said passageway, said sheet having a longitudinal row of perforations and said feeding means including a sprocket meshing with said perforations.

6. Apparatus for controlling the temperatures of furnaces and the like comprising a circuit including a galvanometer and means associated with the furnace for producing an electromotive-force proportional to the temperature of the furnace, a circuit including a battery providing a supply of electromotive-force, a variable resistance in the battery circuit, the other circuit being connected across this variable resistance, an actuator for varying said resistance, a longitudinally movable cam engaging said actuator for varying the electromotive-force in the battery circuit, a normally open circuit including a heating element for the furnace, electromagnetic means for closing the heating circuit, the galvanometer being operable between two positions and effective in one of these positions for closing a circuit to energize said electromagnetic means, the latter means being effective for holding the heating circuit closed while the galvanometer retracts from its circuit closing position, the galvanometer being effective on retracting from said circuit closing position to a second position for short circuiting said electromagnetic means and thereby interrupting the heating circuit.

Signed by me at Lockport, New York, this ninth (9th) day of December, 1929.

LESLIE E. HOWARD.